United States Patent
Lee

(10) Patent No.: US 9,578,197 B2
(45) Date of Patent: Feb. 21, 2017

(54) METHOD OF MANAGING PROGRAMS IN IMAGE FORMING APPARATUS AND IMAGE FORMING APPARATUS USING THE SAME

(71) Applicant: Samsung Electronics Co., Ltd., Suwon-si (KR)

(72) Inventor: Do-soon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 14/065,930

(22) Filed: Oct. 29, 2013

(65) Prior Publication Data
US 2014/0118770 A1    May 1, 2014

(30) Foreign Application Priority Data
Oct. 30, 2012   (KR) .................. 10-2012-0121546

(51) Int. Cl.
| | | |
|---|---|---|
| G06F 3/12 | (2006.01) | |
| G06F 3/048 | (2013.01) | |
| H04N 1/00 | (2006.01) | |
| G06K 15/02 | (2006.01) | |

(52) U.S. Cl.
CPC ...... *H04N 1/00949* (2013.01); *H04N 1/00957* (2013.01); *H04N 1/00411* (2013.01)

(58) Field of Classification Search
CPC ............ H04N 1/00949; H04N 1/00957; H04N 1/0097; H04N 1/00389; H04N 1/00411; H04N 1/4413; H04N 1/4433; G06F 3/1204; G06F 3/1257; G06F 3/127; G06F 3/048; G06F 3/04817; G06F 3/0481; G06F 3/0486

USPC .......... 65/1.11–1.18, 1.9, 2.1; 715/744–747, 715/763, 769, 810, 835, 837, 846; 709/238–240; 358/1.11–1.18, 1.9, 2.1
See application file for complete search history.

(56) References Cited

U.S. PATENT DOCUMENTS

| | | | | |
|---|---|---|---|---|
| 2001/0006423 | A1* | 7/2001 | Subramaniam | G06F 3/1204 358/1.1 |
| 2003/0053106 | A1* | 3/2003 | Kuroda | G06F 3/1203 358/1.13 |
| 2006/0187483 | A1* | 8/2006 | Baba | 358/1.15 |
| 2007/0212096 | A1* | 9/2007 | Kimoto | G03G 15/502 399/81 |
| 2007/0245153 | A1* | 10/2007 | Richtsmeier | G06F 21/32 713/186 |
| 2008/0174819 | A1* | 7/2008 | Hada | G03G 15/5004 358/1.15 |
| 2010/0290068 | A1* | 11/2010 | Okada | G03G 15/50 358/1.9 |
| 2011/0063655 | A1* | 3/2011 | Tian | H04N 1/00209 358/1.15 |
| 2012/0154413 | A1* | 6/2012 | Kim | H04M 1/72563 345/530 |
| 2012/0304280 | A1* | 11/2012 | Hayashida | G06F 21/6218 726/16 |

(Continued)

*Primary Examiner* — Chad Dickerson
(74) *Attorney, Agent, or Firm* — Staas & Halsey LLP

(57) ABSTRACT

A method of managing programs that perform functions that have been previously performed according to a user setting regarding image forming job, based on user information by generating the programs that perform functions that have been previously performed according to the user setting; confirming user information of a user; and storing the generated programs with the confirmed user information and information regarding the generated programs in a storage unit.

12 Claims, 10 Drawing Sheets

(56) References Cited

U.S. PATENT DOCUMENTS

2013/0002725 A1* 1/2013 Kim .................... G06F 9/4445
 345/684

* cited by examiner

FIG. 6

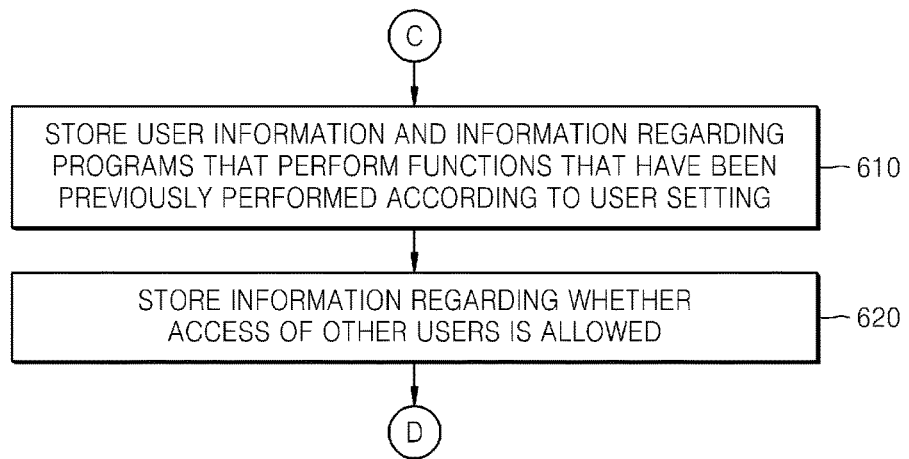

FIG. 7

| Column | Type | Null | Default Value | PK/FK | Note |
|---|---|---|---|---|---|
| _id | Not null | Not null | | PK | Index(Auto-increment) |
| account | Text | Not null | | | UserID |
| item | Integer | Not null | | | Target to launch:<br>Resource ID (general OOB)<br>Program ID (Favorite) |
| item_order | Integer | Not null | | | Item order:Page+order (zero-based)<br>Ex) 10=2page 1th |
| item_visibility | Integer | Not null | | | This item is shown on the Launcher or not |
| border_color | Integer | null | | | border color for the favorite |
| text_color | Integer | null | | | text color for the favorite |
| favorite | Text | null | | | title for the favorite |
| intent | Text | null | | | intent to be baunched OOB |
| Private | Boolean | Not null | | | Public or Private Options |

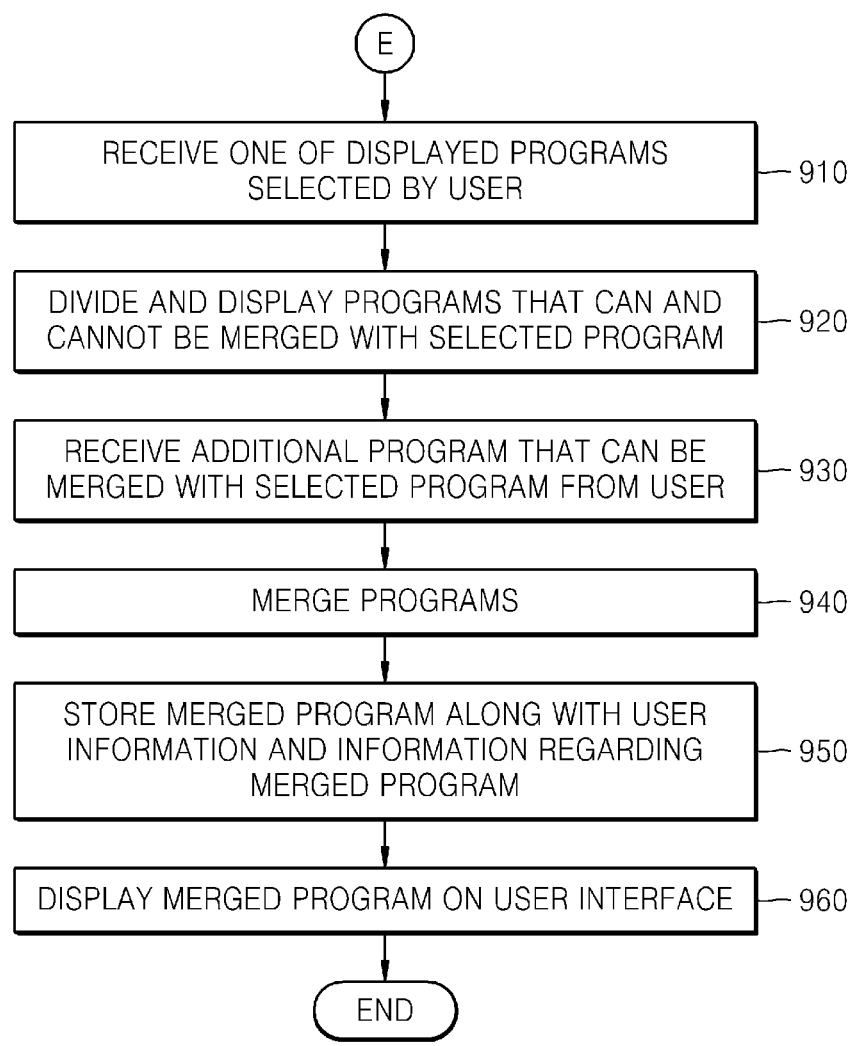

METHOD OF MANAGING PROGRAMS IN IMAGE FORMING APPARATUS AND IMAGE FORMING APPARATUS USING THE SAME

CROSS-REFERENCE TO RELATED APPLICATIONS

This application claims the priority benefit of Korean Patent Application No. 10-2012-0121546, filed on Oct. 30, 2012, in the Korean Intellectual Property Office, the disclosure of which is incorporated herein in its entirety by reference.

BACKGROUND

1. Field

Embodiments relate to a method of managing programs in an image forming apparatus and the image forming apparatus using the method, and more particularly to, a method of managing programs that perform functions that have been previously performed according to a user setting regarding image forming job and an image forming apparatus using the method.

2. Description of the Related Art

A variety of image forming apparatuses such as printers, copiers, facsimiles, multifunctional machines, etc. include user interfaces (UIs) used to control operations of the image forming apparatuses or to input data. UIs increase user convenience when using an image forming apparatus in terms of controlling operations of the image forming apparatus. Owing to the technological developments, hardware and software used in image forming apparatuses has been considerably advanced, and UIs of image forming apparatuses have greatly evolved.

Recently, owing to the spread of smart devices, UIs of image forming apparatuses tend to be changed to smart UIs, and accordingly, a variety of convenience functions available to users has increased.

SUMMARY

In an aspect of one or more embodiments, there is provided a method of managing programs that perform functions that have been previously performed according to a user setting, by an image forming apparatus by storing the programs and user information and the image forming apparatus using the method.

Embodiments are not limited to the above, and other aspects may also be drawn from embodiments described below.

In an aspect of one or more embodiments, there is provided a program management method performed in an image forming apparatus, the method including: generating programs that perform functions that have been previously performed according to a user setting regarding image forming job, wherein the image forming job comprises at least one of printing, copying, scanning, and faxing; confirming user information of a user; and storing the generated programs with the confirmed user information and information regarding the generated programs in a storage unit.

In an aspect of one or more embodiments, there is provided a computer readable recording medium having embodied thereon computer readable instructions to implement methods of embodiments.

In an aspect of one or more embodiments, there is provided an image forming apparatus including: a control unit that generates programs that perform functions that have been previously performed according to a user setting regarding image forming job and confirms user information of a user, wherein the image forming job comprises at least one of printing, copying, scanning, and faxing; a storage unit that stores the generated programs with the confirmed user information and information regarding the generated programs; and a user interface that displays the programs that perform functions that have been previously performed according to the user setting and are stored in the storage unit.

BRIEF DESCRIPTION OF THE DRAWINGS

The above and other aspects of embodiments will become more apparent by describing in detail exemplary embodiments thereof with reference to the attached drawings in which:

FIG. 6 is a detailed flowchart of a process of storing programs that perform functions that have been previously performed according to a user setting;

FIG. 7 is a table of programs that perform functions that have been previously performed according to a user setting, which are stored in a storage unit;

FIG. 9 is a flowchart of a process of merging programs that perform functions that have been previously performed according to a user setting;

DETAILED DESCRIPTION

Figure 1:
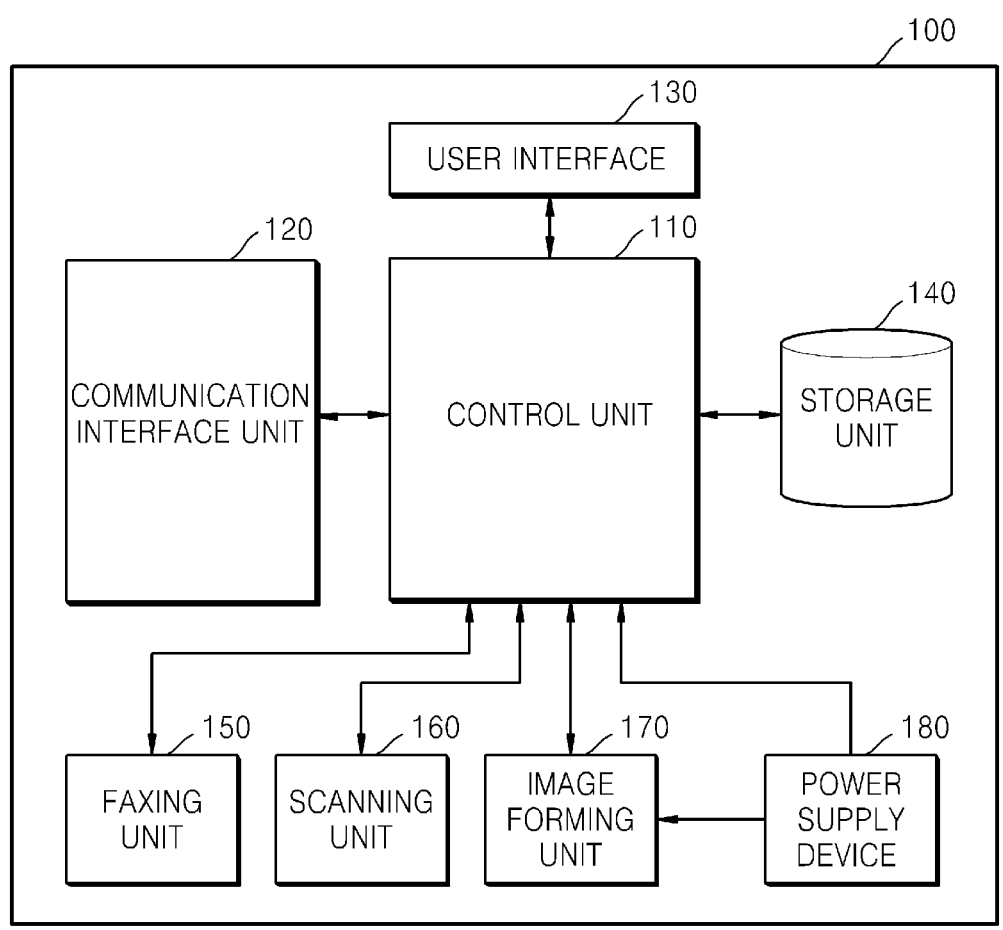
FIG. 1 is a block diagram of an image forming apparatus, according to an embodiment.

Reference will now be made in detail to embodiments, examples of which are illustrated in the accompanying drawings, wherein like reference numerals refer to like elements throughout. Embodiments may have different forms and should not be construed as being limited to the descriptions set forth herein. Accordingly, embodiments are merely described below, by referring to the figures, to explain aspects of the present description. As used herein, expressions such as "at least one of," when preceding a list of elements, modify the entire list of elements and do not modify the individual elements of the list.

FIG. 1 is a block diagram of an image forming apparatus 100, according to an embodiment. Referring to FIG. 1, the image forming apparatus 100 includes a control unit (controller) 110, a communication interface unit (communication interface) 120, a user interface 130, a storage unit 140, a faxing unit 150, a scanning unit (scanner) 160, an image forming unit 170, and a power supply device 180. The image forming apparatus 100 may further include general-use elements in addition to the elements shown in FIG. 1.

The control unit 110 may control general functions of the image forming apparatus 100 and may be a microprocessor. In this regard, control units may be divided into a plurality of processor modules that are separated according to respective functions and a main processor module that manages the processor modules. The control unit 110 may receive or transmit data from and to an external device through the communication interface unit 120. The control unit 110 may identify information input from a user through the user interface 130, and configure a user interface screen such that the user interface 130 may output a processing result of the control unit 110. The control unit 110 may control the storage unit 140 to store various types of programs and data or load the programs and data stored in the storage unit 140. The control unit 110 may control an operation of the faxing unit 150 to transmit and receive a fax or may control an operation of the scanning unit 160 to scan a document. The control unit 110 may compare the data loaded from the storage unit 140 with the data received from the external device or data input through the user interface 130 or transfer the data stored in the storage unit 140 to the image forming unit 170. The control unit 110 is operable by voltage output from the power supply device 180.

The communication interface unit 120 may include a network module used to connect to a network, a modem used to transmit and receive faxes, a universal serial bus (USB) host module used to form a data mobile channel with a mobile storage medium, etc., according to applications and functions of the image forming apparatus 100. In this regard, the external device is a device connected to the image forming apparatus 100 over a wired or wireless network and may include a personal computer (PC) such as a laptop or a desktop, a mobile device such as a smart phone, a personal digital assistant (PDA), a fax machine, and the like.

The user interface 130 may obtain an input signal from the user and display information to the user. For example, the user interface 130 may include input and output devices such as a capacitive or piezoelectric touch screen, a display panel, a touch pad, a keyboard, a mouse, a speaker, and the like, which are prepared for the image forming apparatus 100. A case where the user interface 130 is the touch screen will now be described for convenience of description.

The storage unit 140 may store programs and data that are generated according to the operation of the image forming apparatus 100 or used in the image forming apparatus 100. For example, the storage unit 140 may store the data received from the external device, the data input through the user interface 130, data generated by the operation of the image forming apparatus 100 such as fax data, scan data, and copy data, and various types of programs used to control the image forming apparatus 100.

The faxing unit 150 may transmit or receive faxes through the modem. The fax unit 150 may prepare fax data suitable for transmitting image data recorded onto paper through the modem or transfer fax data received from the external device to the image forming unit 170 to output the fax data to the paper.

The scanning unit 160 may scan the image data recorded on the paper, generate scan data, and transfer the scan data to the communication interface unit 120 for the connection to the network, to the storage unit 140 for storage, to the faxing unit 150 for fax transmission, or to the image forming unit 170 for printing, etc. That is, the scanning unit 160 may perform functions SCAN TO SM (server message block), SCAN TO FTP (file transfer protocol), SCAN TO WebDAV (web distributed authoring and versioning), SCAN TO E-mail, SCAN TO PC, SCAN TO BOX, etc.

The image forming unit 170 may form an image and perform an operation of outputting copy and printing data to the paper. The image forming unit 170 may include hardware units that perform charging, exposure, developing, fusing, and fixing to output the copy and printing data to the paper, and a software module used to drive the hardware units. The image forming unit 170 is operable by the voltage output from the power supply device 180.

The power supply device 180 may be an apparatus that outputs an alternating current (AC) voltage supplied from an external power supply source to an appropriate direct current (DC) voltage used in an electronic product by using a transformer. The image forming apparatus 100 needs a power supply device having a simple structure and a small size and capable of a stable power supply, and thus a switching mode power supply (SMPS) is mainly used as the power supply device 180.

Figure 2:
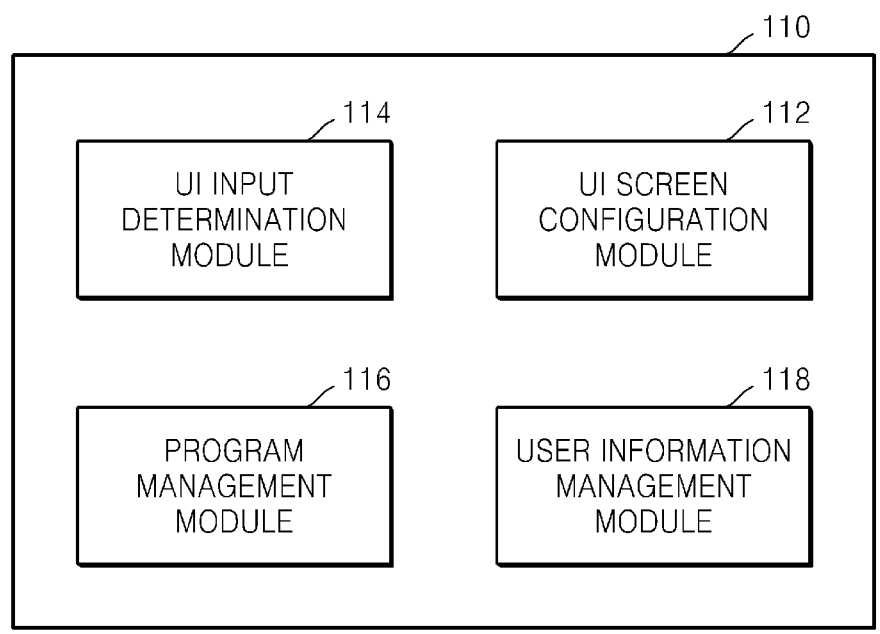
FIG. 2 is a block diagram of a control unit that is an element of the image forming apparatus of FIG. 1.

FIG. 2 is a block diagram of the control unit 110 that is an element of the image forming apparatus of FIG. 1. The control unit 110 may include processing modules such as a user interface (UI) screen configuration module 112, a UI input determination module 114, a program management module 116, and a user information management module 118 as shown in FIG. 2. However, the control unit 110 may further include general-use elements in addition to the elements shown in FIG. 2.

The UI screen configuration module 112 may configure a screen that is to be output on a UI. The UI screen configuration module 112 may use various types of programs and data stored in the storage unit 140 to configure the screen that is to be displayed on the UI and configure the screen that can be adaptively varied with respect to information input to the UI.

The UI input determination module 114 may analyze the information input to the UI from a use and analyzes the information input by the user. The UI input determination module 114 may determine whether user information such as a user ID or password is input or which application, function, and option are selected by the user to allow the image forming apparatus 100 to perform an appropriate operation.

The program management module 116 may be a module that manages various types of programs for the operation of the image forming apparatus 100. The programs may include an operating program for a basic operation of the image forming apparatus 100 and a functional program for performing various types of applications, functions, and options supported by the image forming apparatus 100. In particular, in an embodiment, the program management module 116 may manage programs that perform functions that have been previously performed according to a user setting regarding image forming job. The image forming job may comprise at least one of printing, copying, scanning, and faxing. The programs that perform functions that have been previously performed according to the user setting may be referred to as programs that perform user definition functions again. The programs that perform functions that have been previously performed according to the user setting may be programs stored to perform an application, function, and option that were previously selected by the user. The program management module 116 may control various types of programs to be generated, stored, removed, modified, merged, called, and executed, in particular, generate and store the programs that perform functions that have been previously performed according to the user setting or control the storage unit 140 to call and execute the programs, or merge and store the programs that perform functions that have been previously performed according to two or more user settings.

The user information management module 118 may be a module that confirms the user information, generates a new user account, or changes or deletes an existing user account. A user of the image forming apparatus 100 may input a user's own information such as an ID and password through the user interface 130. The user information management module 118 may determine whether the input user information is valid user information to authorize the user to control the image forming apparatus 100 or use the image forming apparatus 100. For example, in an embodiment where there is a confirmation request for the user information from the program management module 116, the user information management module 118 may confirm and notify the user information to the image forming apparatus 100.

Figure 3:
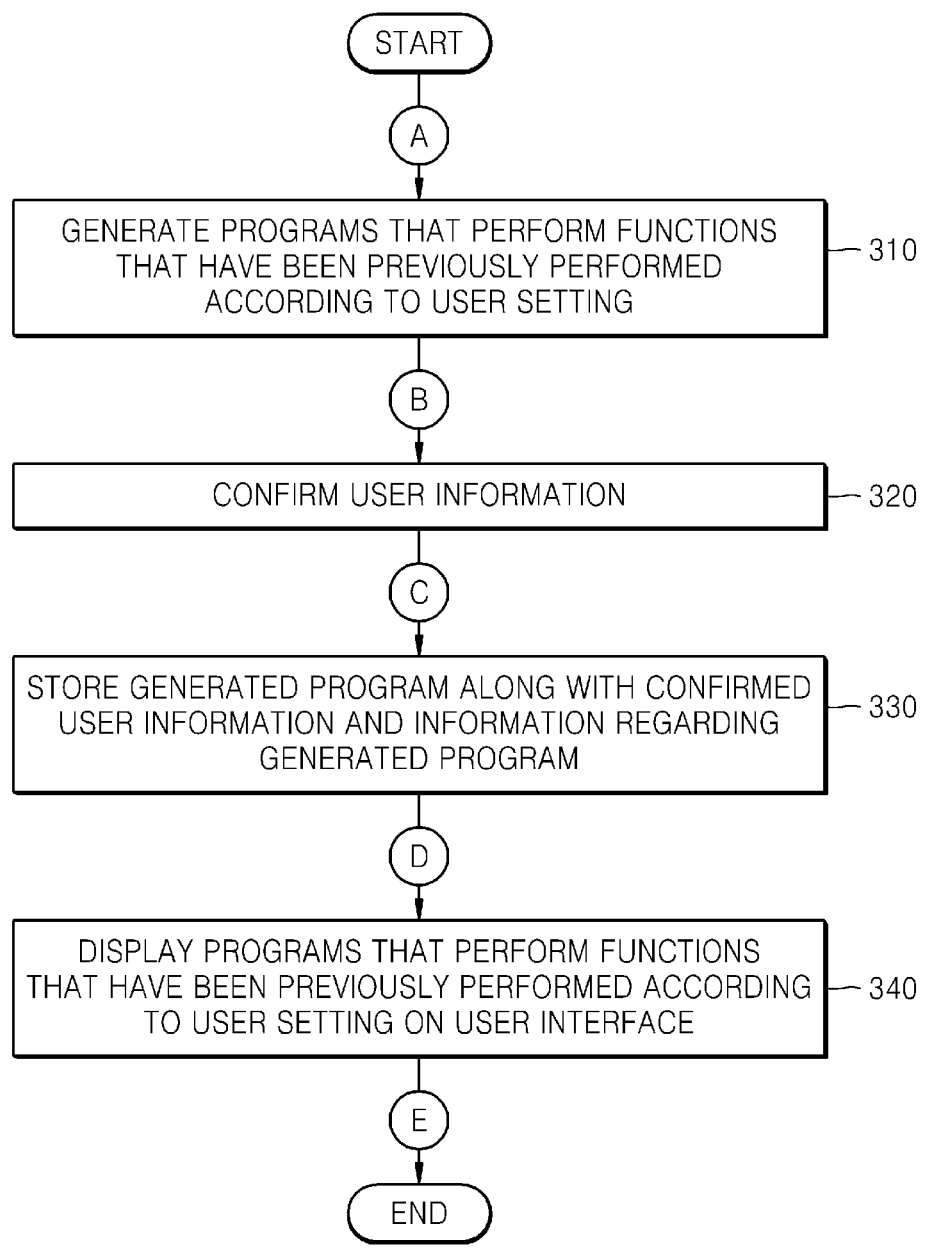
FIG. 3 is a flowchart of a program management method performed by an image forming apparatus.

FIG. 3 is a flowchart of a program management method performed by an image forming apparatus. Elements, although omitted in FIG. 3, that were described with reference to the image forming apparatus 100, may also be applied to the program management method performed by the image forming apparatus of the present embodiment.

In operation 310, the image forming apparatus 100 generates programs that perform functions that have been previously performed according to a user setting regarding image forming job. The image forming job may comprise at least one of printing, copying, scanning, and faxing. The image forming apparatus 100 generates a program that receives an application supported by the image forming apparatus 100, a function, and an option selected by a user of the image forming apparatus 100, stores the selected application, function, and option in order to perform them without having to select them again. Operation 310 will now be described in more detail below.

Figure 4:
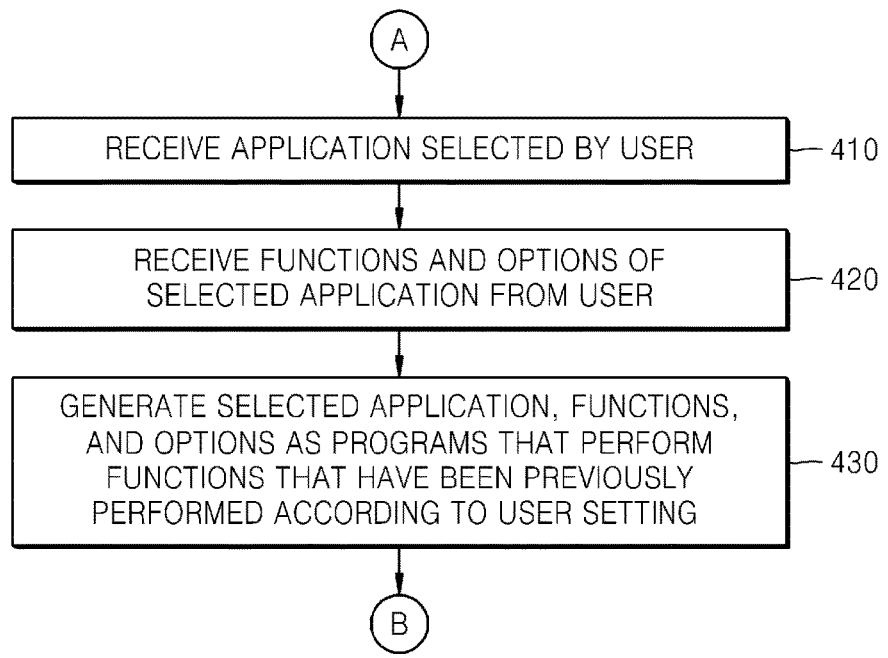
FIG. 4 is a detailed flowchart of a process of generating programs that perform functions that have been previously performed according to a user setting.

FIG. 4 is a detailed flowchart of a process of generating programs that perform functions that have been previously performed according to a user setting.

In operation 410, one of applications supported by the image forming apparatus 100 is selected by a user. For example, in a case where the user interface 130 is a touch screen, the user may select an icon of an application that is to be executed from various applications displayed on the touch screen. If a weak current or finger pressure that is generated from a user's hand is sensed from the touch screen, the UI input determination module 114 of the control unit 110 determines a user's selection based on a location of the touch screen touched by the user.

In operation 420, a function supported by the application selected by the user and an option of the function are received from the user. For example, in a case where the user selects a copy application, functions such as paper size and number, reduced or enlarged copy, whether to make a duplex copy, whether to make a color copy and options of the functions may be selected and received. Likewise in the case where the application is selected in operation 410, if the user selects a function and option through the user interface 130, the UI input determination module 114 of the control unit 110 determines the function and option selected by the user.

In operation 430, the application, function, and option selected by the user are generated as programs that perform functions that have been previously performed according to a user setting regarding image forming job. The program management module 116 of the control unit 110 generates programs that store and perform the application, function, and option selected by the user as they are. In this regard, the user may determine the programs that perform functions that have been previously performed according to the user setting as a name defined by the user. When the user displays the programs that perform functions that have been previously performed according to the user setting on the user interface 130, the user may select types of the programs. For example, the types may be icons that are to be displayed on the user interface 130 or a program list.

Figure 5:
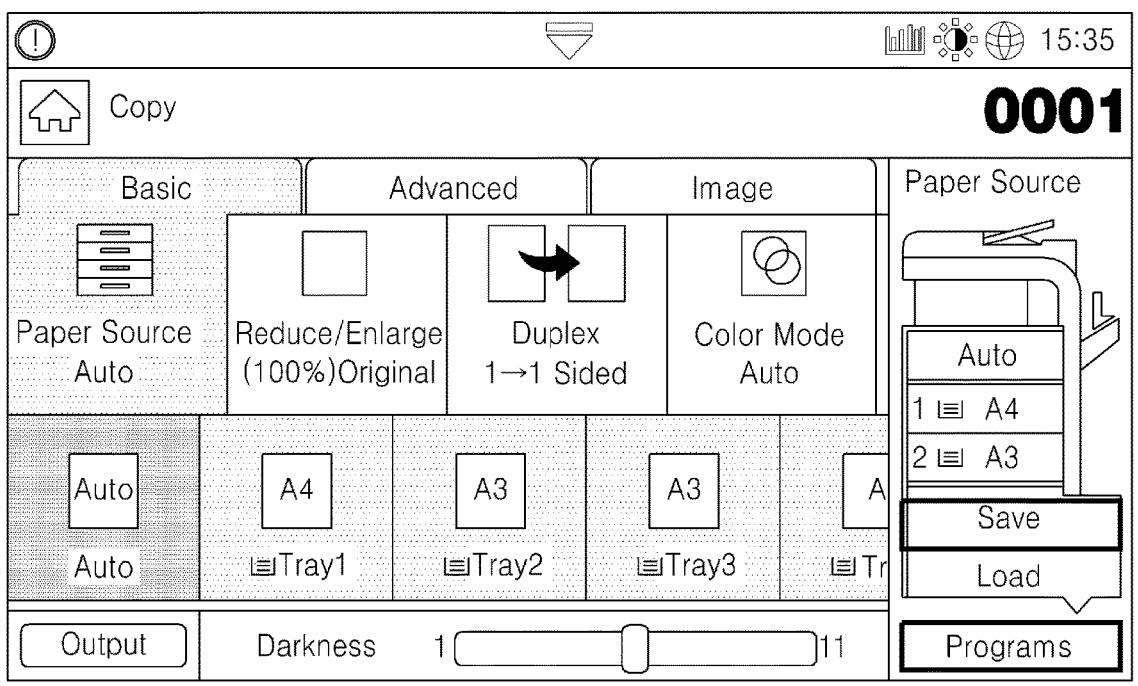
FIG. 5 illustrates a screen for generating programs that perform functions that have been previously performed according to a user setting.

FIG. 5 illustrates a screen for generating programs that perform functions that have been previously performed according to a user setting.

Referring to FIG. 5, a user selects a copy application from applications supported by the image forming apparatus 100 and selects an auto option for a paper source function at a basic tab. The user may additionally select options regarding a reduced or enlarged function, a duplex copy function, and a color copy function. After the user selects functions and options desired by the user, the user clicks a Programs button of the right bottom to generate the selected functions and options as the programs that perform functions that have been previously performed according to the user setting, selects a Save button, and completely generates the programs that perform the functions that have been previously performed according to the user setting.

Referring back to FIG. 3, in operation 320, user information of the user is confirmed. The user of the image forming apparatus 100 may input the user's ID and password through the user interface 130 to use the image forming apparatus 100. The input user information is managed by the user information management module 118 of the control unit 110. Thus, the user information may be confirmed from the user information management module 118.

In operation 330, the confirmed user information and information regarding the programs that perform functions that have been previously performed according to the user setting are combined and stored with the programs that perform functions that have been previously performed according to a user setting in the storage unit 140. The program management module 116 of the control unit 110 controls generation of the programs that perform functions that have been previously performed according to the user setting, combining of the user information confirmed from the user information management module 118 and the information regarding the programs before storing the programs in the storage unit 140, and storing of the generated programs with the confirmed user information and information regarding the generated programs in the storage unit 140. Operation 330 will now be described in more detail with reference to FIG. 6.

FIG. 6 is a detailed flowchart of a process of storing programs that perform functions that have been previously performed according to a user setting.

In operation 610, the information regarding the programs that perform functions that have been previously performed according to the user setting and the confirmed user information and stored, in order to block access of other users to the programs except the user who generates the programs that perform functions that have been previously performed according to the user setting. That is, if the user information is not stored with the information regarding the programs, users are not identified and access the programs, which cause a problem in terms of changing and deleting the programs.

In operation 620, information regarding whether access by other users to the programs that perform functions that have been previously performed according to the user setting is allowed is received from the user and stored. The programs that perform functions that have been previously performed according to the user setting is already combined with the user information, and thus access by other users to the programs is originally blocked. However, access by other users to the programs may be fine or may be necessary according to circumstances, and thus access by other users to the programs can be exceptionally allowed. For example, a screen, i.e., a check box may be provided on an UI so as to determine the programs that perform functions that have been previously performed according to the user setting as public programs or private programs. A selection of one of public programs and private programs may be received from the user.

FIG. 7 is a table of programs that perform functions that have been previously performed according to a user setting, which are stored in the storage unit 140.

Referring to FIG. 7, information regarding the programs that perform functions that have been previously performed according to the user setting is prepared in database and stored in the storage unit 140. For example, _id, item, item_order, item_visibility, border_color, text_color, intent, etc. in columns are information regarding the programs that perform functions that have been previously performed according to the user setting. The column favorite is an intrinsic number of a program generated to identify programs on a system since names of programs defined by a user may be redundant. The column account is information indicating a user account such as a user ID and corresponds to user information, and as shown in FIG. 7, is stored in the storage unit 140 along with the information regarding the programs that perform functions that have been previously performed according to the user setting. Also, the column private is information indicating whether access by other users to the programs that perform functions that have been previously performed according to the user setting is allowed, and may also be stored in the storage unit 140 along with the information regarding the programs that perform functions that have been previously performed according to the user setting.

Referring back to FIG. 3, in operation 340, the programs that perform functions that have been previously performed according to the user setting, which are stored in the storage unit 410, may be displayed on the user interface 130 of the image forming apparatus 100. The UI screen configuration module 112 of the control unit 110 may receive the programs that perform functions that have been previously performed according to the user setting and are stored in the storage unit 410, through the program management module 116, and generate an image that is to be output on a screen of the user interface 130 in order to display the programs on the user interface 130. In this regard, all programs that perform the functions that have been previously performed according to the user setting and are stored in the storage unit 410 may be displayed on the user interface 130, or a program that performs the function that has been previously performed according to the user setting having the same user information as the user information confirmed from the user information management module 118 or to which access by other users is allowed may be displayed on the user interface 130. Operation 340 will now be described in more detail with reference to FIG. 8.

Figure 8A:
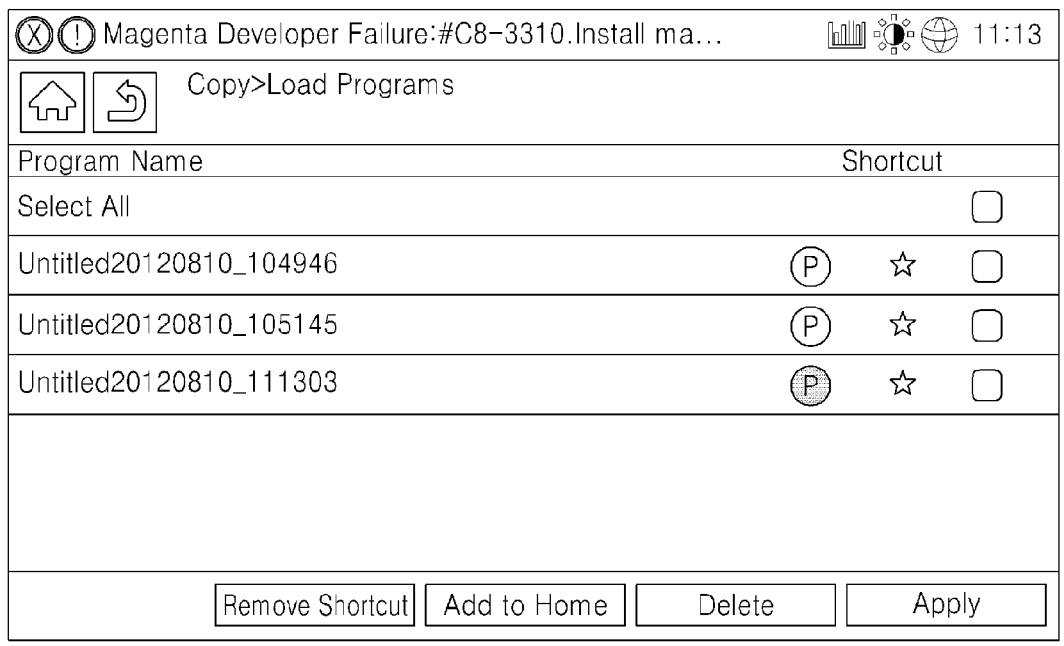
FIGS. 8A and 8B illustrate screens of a user interface that display programs that perform functions that have been previously performed according to a user setting.
Figure 8B:
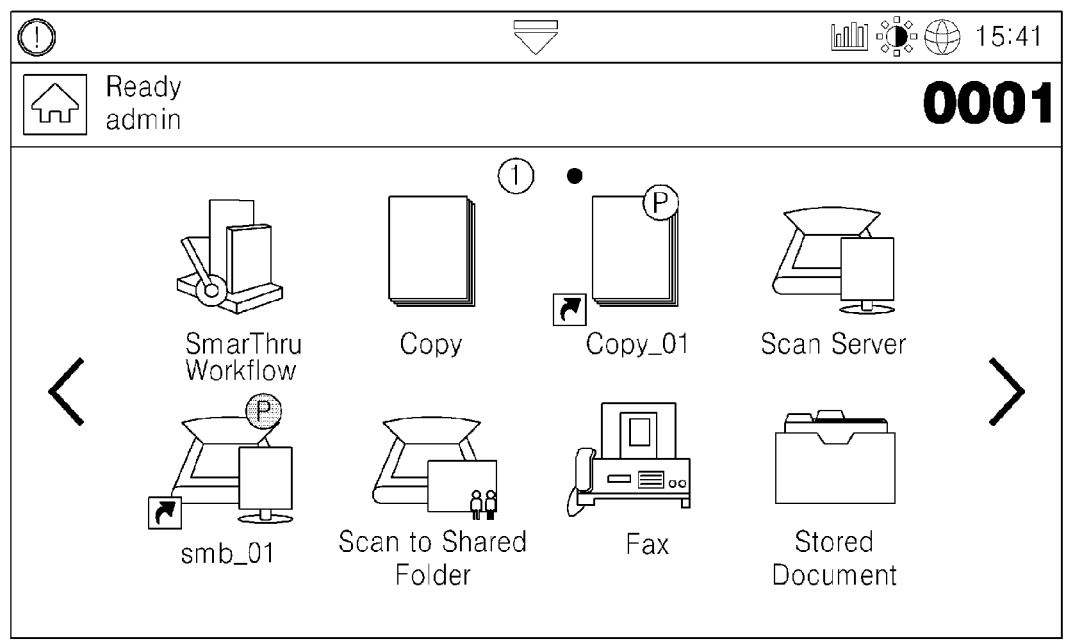

FIGS. 8A and 8B illustrate screens of the user interface 130 that display programs that perform functions that have been previously performed according to a user setting. The programs that perform functions that have been previously performed according to the user setting may be displayed on the user interface 130 as a program list or as icons. The program list is a list of the programs that perform functions that have been previously performed according to the user setting. A program list corresponding to each application may be confirmed by pressing a Programs button and then a Load button. The icons are displayed as shortcuts per program on a home screen on which each application may be selected.

FIG. 8A shows a screen of the user interface 130 that displays the programs that perform functions that have been previously performed according to the user setting as the program list. The user interface 130 may display three programs that perform functions that have been previously performed according to the user setting, relating to a copy application and information indicating whether access by other users to each program is allowed. First and second programs of the program list indicate P denoting public, and a third program thereof indicates P denoting private. The two Ps may be identified by using different background colors.

FIG. 8B shows a screen of the user interface 130 that displays the programs that perform functions that have been previously performed according to the user setting as the icons. The user interface 130 displays the icons of the programs that perform functions that have been previously performed according to the user setting as shortcuts of the home screen on which each application may be selected. A third icon Copy_01 of a first line and a first icon cmb_01 of a second line are the icons of the programs that perform functions that have been previously performed according to the user setting. P denoting public and P denoting private are displayed on the top right portion of each icon. Likewise, the two Ps may be identified by using different background colors.

Methods of merging and performing programs that perform functions that have been previously performed according to a user setting and are displayed on the user interface 130 will now be described below.

FIG. 9 is a flowchart of a process of merging programs that perform functions that have been previously performed according to a user setting.

In operation 910, one of the programs that perform functions that have been previously performed according to the user setting displayed on the user interface 130 is selected by and received from a user. The UI input determination module 114 of the control unit 110 receives information input through the user interface 130 and confirms the selected program.

In operation 920, the programs that perform functions that have been previously performed according to the user setting are divided into the programs that can and cannot be merged with the selected program and displayed on the user interface 130. The program management module 116 of the control unit 110 discovers the programs that can be merged with the selected program by using information regarding the programs that perform functions that have been previously performed according to the user setting and are stored in the storage unit 140. That is, the program management module 116 of the control unit 110 discovers the programs that perform functions that have been previously performed according to the user setting and can be merged with each other based on data values of the columns, namely account, favorite, and private, from the database of programs of FIG. 7. Among the programs that perform functions that have been previously performed according to the user setting and are displayed on the user interface 130, the programs that can be merged with each other and are discovered by the program management module 116 may be enabled or made to flicker, or to the contrary, the program that cannot be merged with each other may be colored gray.

In operation 930, at least one of the programs that are divided, displayed, and can be merged with another is additionally selected by and received from the user. That is, at least one of the programs that are enabled or made to flicker and can be merged with another is selected as a program that is to be merged with the program selected in operation 910.

In operation 940, the program initially selected by the user and the at least one program additionally selected by the user are merged with each other. The program management module 116 of the control unit 110 merges at least two of the programs that perform functions that have been previously performed according to the user setting. In this regard, the user may determine the merged program that performs functions that have been previously performed according to the user setting as a name defined by the user. Also, the user may select a type of the merged program that performs functions that have been previously performed according to the user setting when the merged program is displayed on the user interface 130.

In operation 950, information regarding the merged program and user information of the user are combined and stored along with the merged program in the storage unit 140. The program management module 116 of the control unit 110 combines the information regarding the merged program and the user information confirmed from the user information management module 118 and stores the combined information in the storage unit 140 before storing the merged program in the storage unit 140. In this regard, information regarding whether access by other users to the merged program that performs functions that have been previously performed according to the user setting is allowed may be received from the user and stored in the storage unit 140.

In operation 960, the merged program that performs functions that have been previously performed according to the user setting is displayed on the user interface 130. The merged program that performs functions that have been previously performed according to the user setting is additionally displayed on an existing screen of the user interface 130.

A process of merging the programs that perform functions that have been previously performed according to the user setting of FIG. 9 will now be described in more detail with reference to FIGS. 10 and 11.

Figure 10:
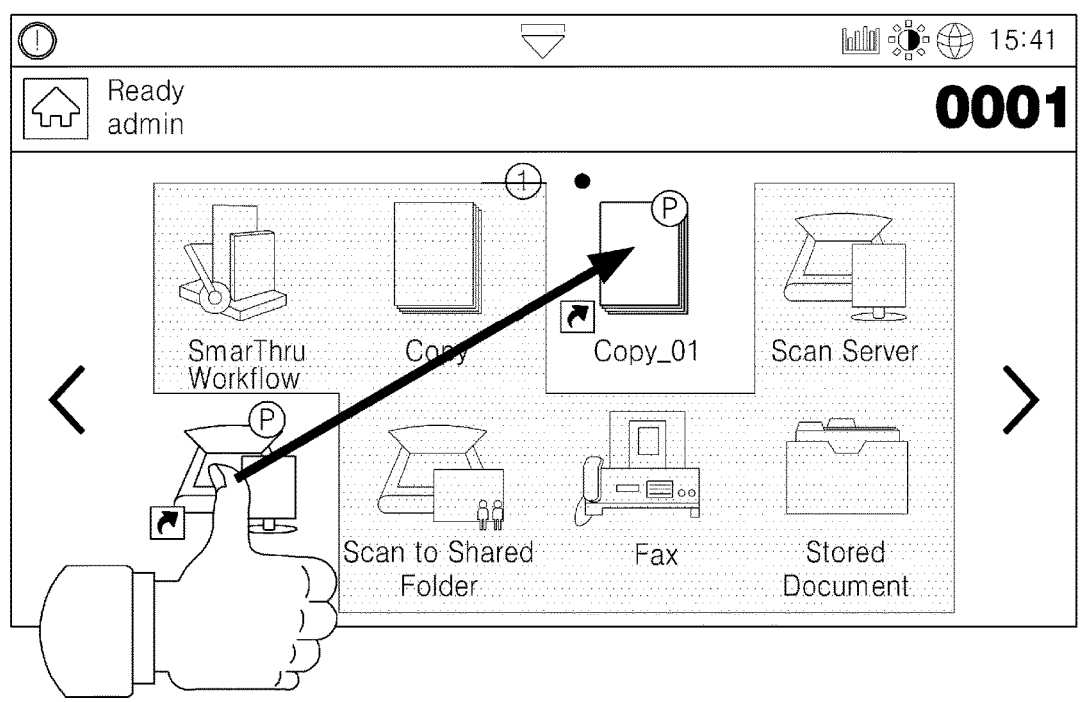
FIG. 10 illustrates a touch screen allowing a user to select programs that can be merged with each other and receiving the programs from a user.

FIG. 10 illustrates a touch screen allowing a user to select programs that can be merged with each other and receive the programs from the user.

The user selects a first icon of a second line on the touch screen. In this regard, the user presses the selected icon for a short time as an operation for notifying about a merger request of programs that perform functions that have been previously performed according to a user setting. As a result, the icons displayed on the touch screen are enabled, colored gray, and divided into two groups. In this regard, the enabled icons indicate icons that can be merged with the icon selected by the user, and the icons that are colored gray indicate icons that cannot be merged with the icon selected by the user. The user drags and drops the selected icon to the icons that can be merged with the selected icon while pressing the selected icon. Unlike those shown in FIG. 10, at least one of the icons that can be merged with the selected icon may be checked without dragging the selected icon. As a result, the programs that perform functions that have been previously performed according to the user setting corresponding to the two icons are merged and stored in the storage unit 140.

From the perspective of a processor, the UI input determination module 114 of the control unit 110 senses a program merger request input through the user interface 130 and informs the program management module 116 of the sensed program merger request, and the program management module 116 determines programs that can be merged with a program selected by the user and transfers the determined programs to the UI screen configuration module 112. The UI screen configuration module 112 configures a screen of the user interface 130 such that programs that can and cannot be merged with the program selected by the user may be distinguished from each other and outputs the screen to the user interface. The UI input determination module 114 senses a user's additional selection of a program that is to be merged with the program selected by the user and informs the program management module 116 of the sensed user's additional selection of the program. The program management module 116 merges the two programs. The merged program that performs functions that have been previously performed according to the user setting is transferred to and stored in the storage unit 140.

Figure 11:
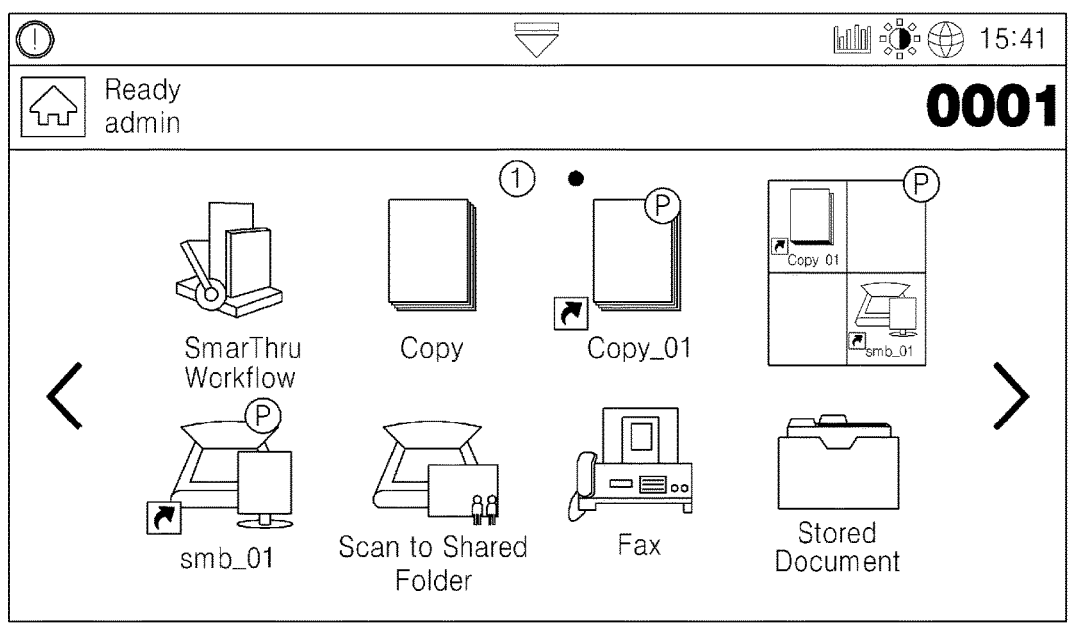
FIG. 11 illustrates a touch screen for merging programs that perform functions that have been previously performed according to a user setting and displaying the merged program on a user interface.

FIG. 11 illustrates a touch screen for merging programs that perform functions that have been previously performed according to a user setting and displaying the merged program on the user interface 130.

Compared to the touch screen of FIG. 10, a new fourth icon is displayed on a first line of the touch screen of FIG. 11. The new fourth icon is a reduced combination of icons smb_01 and Copy_01 that are merger objects. P denoting public indicating that access by other users is allowed is also displayed on the top right of the new fourth icon.

Figure 12:
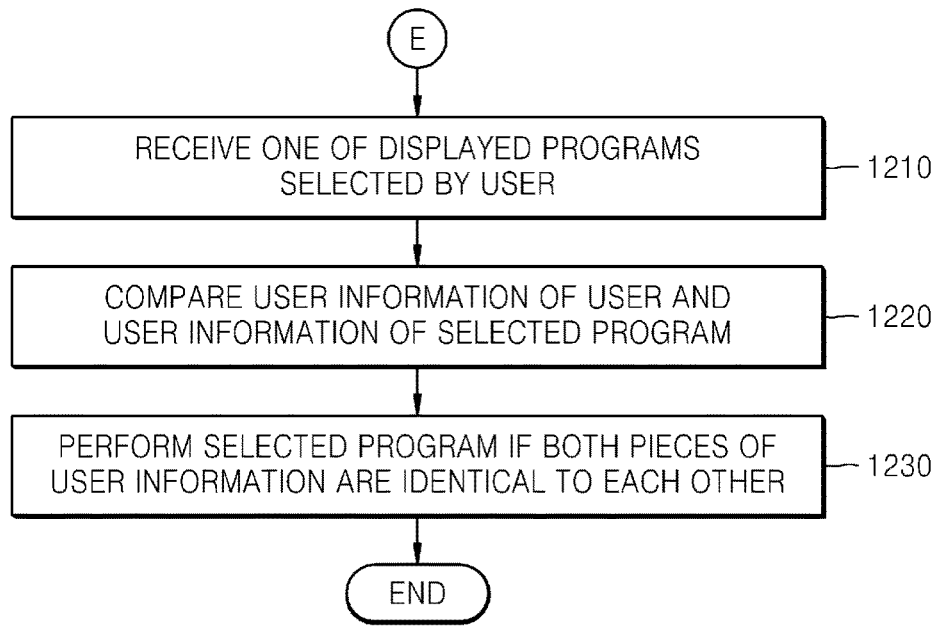
FIG. 12 is a flowchart of a process of performing programs that perform functions that have been previously performed according to a user setting.

FIG. 12 is a flowchart of a process of performing programs that perform functions that have been previously performed according to a user setting.

In operation 1210, one of programs that perform functions that have been previously performed according to a user setting and are displayed on the user interface 130 is selected by and sent from a user. The UI input determination module 114 of the control unit 110 receives information input through the user interface 130 and confirms the selected program.

In operation 1220, user information of the user and user information of the selected program are compared with each other. The program management module 116 of the control unit 110 obtains information regarding the selected program that performs functions that have been previously performed according to the user setting from the storage unit 140. The information regarding the selected program obtained from the storage unit 140 includes the user information stored when the programs that perform functions that have been previously performed according to a user setting are generated and stored. Thus, the user information included in the information regarding the selected program obtained from the storage unit 140 and the user information of the user are compared with each other to determine whether the selected program can be performed.

In operation 1230, as a result of comparing the user information included in the information regarding the selected program obtained from the storage unit 140 and the user information of the user, if both pieces of user information are identical to each other, the selected program is performed. However, although the user information of the selected program and the user information of the user are different from each other, in a case where the selected program is not set as private but public, the selected program may be performed.

Figure 13:
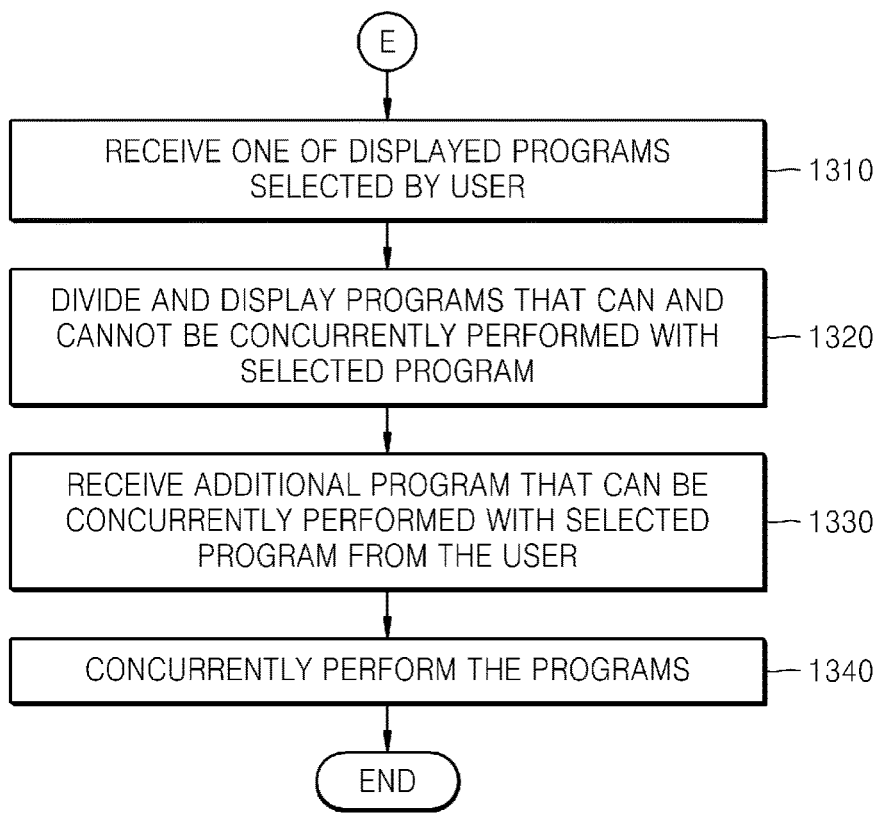
FIG. 13 is a flowchart of a process of concurrently performing programs that perform functions that have been previously performed according to a user setting.

FIG. 13 is a flowchart of a process of concurrently performing programs that perform functions that have been previously performed according to a user setting.

In operation 1310, one of programs that perform functions that have been previously performed according to a user setting and is displayed on the user interface 130 is selected by and sent from a user. The UI input determination module 114 of the control unit 110 receives information input through the user interface 130 and confirms the selected program.

In operation 1320, the programs that perform functions that have been previously performed according to the user setting are divided into the programs that can and cannot be concurrently performed with the selected program and displayed on the user interface 130. The program management module 116 of the control unit 110 discovers the programs that can be concurrently performed with the selected program by using information regarding the programs that perform functions that have been previously performed according to the user setting and is stored in the storage unit 140. That is, the program management module 116 of the control unit 110 discovers the programs that perform functions that have been previously performed according to the user setting and can be concurrently performed with the selected program based on data values of the columns, namely account, favorite, and private, from the database of programs of FIG. 7, and types of applications, functions, and options. Among the programs that perform functions that have been previously performed according to the user setting and are displayed on the user interface 130, the programs that can be concurrently performed with the selected program and discovered by the program management module 116 may be enabled or made to flicker, or to the contrary, the program that cannot be concurrently performed with the selected program may be colored gray.

In operation 1330, at least one of the programs that are divided, displayed, and can be concurrently performed with the selected program is additionally selected by and sent from the user. That is, at least one of the programs that are enabled or made to flicker and can be concurrently performed with the selected program is selected as a program that is to be concurrently performed with the program selected in operation 1310.

In operation 1340, the program initially selected by the user and the at least one program additionally selected by the user are concurrently performed. The program management module 116 of the control unit 110 concurrently performs at least two of the programs that perform functions that have been previously performed according to the user setting.

Programs that perform functions that have been previously performed according to a user setting, by storing the programs and user information in an image forming apparatus, can be managed in various ways based on the user information.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A program management method performed in an image forming apparatus, the method comprising:
by the image forming apparatus, including at least one processor:
generating programs that perform functions that have been previously performed according to a user setting regarding image forming job, wherein the image forming job comprises at least one of printing, copying, scanning, and faxing;
confirming information of a user;
displaying a screen provided on a user interface of the image forming apparatus to receive information regarding whether access by other users to the generated programs that perform functions that have been previously performed according to the user setting is allowed;
wherein the generating of the programs comprises by way of the user interface:
receiving information of an application supported by the image forming apparatus, in response to selection for the application,
receiving functions, options of the selected application,
causing generation of the selected application, functions, options as the programs that perform functions that have been previously performed according to the user setting, in response to selection of a programs button, and causing storing of the generated programs with the confirmed user information, information regarding the generated programs, and the received information regarding whether access by other users to the generated programs is allowed in a storage unit, in response to selection of a save button;

displaying the programs differently, that perform functions that have been previously performed according to the user setting and are stored in the storage unit, according to the received information on the user interface of the image forming apparatus so that the user identifies whether access by others to the generated programs is allowed, wherein the displaying comprises displaying the programs that perform functions that have been previously performed according to the user setting as icons or a program list, wherein the displaying further comprises placing an indicator on top of the icons or in the program list, wherein the indicator denotes public or private, and wherein the public indicator is displayed differently than the private indicator using different background colors;

receiving one of the displayed programs that perform functions that have been previously performed according to the user setting and are selected by and sent from the user via selecting an icon on the user interface for a predetermined period of time for notifying about a merger request of programs that perform functions that have been previously performed according to the user setting;

dividing the programs that perform functions that have been previously performed according to the user setting into the programs that can and cannot be merged with the selected program and displaying the divided programs as enabled programs and programs that are colored gray;

additionally receiving at least one of the programs that are divided, displayed, and can be merged with the selected program selected by and sent from the user;

merging the selected program and the additionally selected at least one program via a drag and drop operation;

storing the merged programs with the user information and information regarding the merged programs in the storage unit; and displaying on the user interface the merged program separately from each of the at least two programs selected by the user, the merged program displayed in the form of a merged program icon containing the multiple programs selected for merging and the indicator denoting public or private.

2. The method of claim 1, wherein the displaying further comprises: displaying information regarding whether access by other users to the generated programs that perform functions that have been previously performed according to the user setting is allowed, along with the icons or the program list.

3. The method of claim 1, wherein the displaying comprises:
displaying the programs that perform functions that have been previously performed according to the user setting and have user information that is identical to user information of a current user of the image forming apparatus.

4. The method of claim 3, wherein the displaying further comprises:
displaying the programs that perform functions that have been previously performed according to the user setting, to which access by other users is allowed.

5. The method of claim 1, wherein the storing of the merged programs comprises: storing information regarding whether access by other users to the merged programs is allowed.

6. The method of claim 1, further comprising:
comparing the user information of the user and user information of the selected program; and
performing the selected program if both pieces of user information are identical to each other.

7. The method of claim 1, further comprising:
dividing the programs that perform functions that have been previously performed according to the user setting into the programs that can and cannot be concurrently performed with the selected program and displaying the divided programs.

8. The method of claim 7, further comprising:
additionally receiving at least one of the programs that are divided, displayed, and can be concurrently performed with the selected program selected by and sent from the user; and
concurrently performing the selected program and the additionally selected at least one program.

9. At least one non-transitory computer readable medium storing computer readable instructions that control at least one processor to implement the method of claim 1.

10. An image forming apparatus comprising:
a controller that generates programs that perform functions that have been previously performed according to a user setting regarding image forming job and confirms user information of a user, wherein the image forming job comprises at least one of printing, copying, scanning, and faxing;
a user interface displays a screen to receive information regarding whether access by other users to the generated programs that perform functions that have been previously performed according to the user setting is allowed;
wherein the controller that generates the programs:
receives, by way of the user interface, information of an application supported by the image forming apparatus in response to selection for the application,
receives functions, options of the selected application by way of the user interface, and
generates selected application, functions, options as the programs that perform functions that have been previously performed according to the user setting in response to the user interface notifying the controller of selection of a programs button on the user interface; and
a storage unit that stores the generated programs, with the confirmed user information, information regarding the generated programs, and the received information regarding whether access by other users to the generated programs is allowed in response to selection of a save button on the user interface,
wherein the user interface that displays the programs differently, that perform functions that have been previously performed according to the user setting and are stored in the storage unit, according to the received information so that the user identifies whether access by others to the generated programs is allowed, wherein the user interface that displays the programs differently displays the programs that perform functions that have been previously performed according to the user setting as icons or a program list, wherein the user interface that displays the programs differently places an indicator on top of the icons or in the program list, wherein the indicator denotes public or private, and wherein the public indicator is displayed differently than the private indicator using different background colors, wherein the user interface receives a merger request, via selecting an icon on the user interface for a predetermined period of time, of at least two programs that perform functions that have been previously performed according to a user setting from the user, divides the programs that perform functions that have been previously performed according to the user setting into the programs that can and cannot be merged with the selected program, and displays the divided programs as enabled programs and programs that are colored gray, wherein the controller merges the at least two programs selected by the user from among the programs that perform functions that have been previously performed according to the user setting, via a drag and drop operation, and stores the merged programs with the user information and information of the merged program, and wherein the user interface displays the merged program separately from each of the at least two programs selected by the user, the merged program displayed in the form of a merged program icon containing the multiple programs selected for merging and the indicator denoting public or private.

11. The image forming apparatus of claim 10, wherein the user interface displays programs that perform functions that have been previously performed according to a user setting to which access by other users is allowed and have user information identical to user information of a current user of the image forming apparatus.

12. The image forming apparatus of claim 10, wherein:
the user interface receives one of the displayed programs that perform functions that have been previously performed according to the user setting and are selected by the user,
the controller compares the user information of the user and user information of the selected program, and, if both the user information are identical to each other, performs the selected program.

* * * * *